(12) United States Patent
Wu

(10) Patent No.: US 7,600,150 B2
(45) Date of Patent: Oct. 6, 2009

(54) DATA AUTO BACKUP SYSTEM AND METHOD

(75) Inventor: Chen-Kuan Wu, Taoyuan (TW)

(73) Assignee: Mitac International Corporation, Taoyuan (TW)

( * ) Notice: Subject to any disclaimer, the term of this patent is extended or adjusted under 35 U.S.C. 154(b) by 417 days.

(21) Appl. No.: 11/534,643

(22) Filed: Sep. 23, 2006

(65) Prior Publication Data

US 2007/0220315 A1    Sep. 20, 2007

(30) Foreign Application Priority Data

Feb. 24, 2006    (TW) ............................... 95106231 A

(51) Int. Cl.
*G06F 11/00* (2006.01)

(52) U.S. Cl. .................. 714/6; 710/74; 710/20

(58) Field of Classification Search ........................ None
See application file for complete search history.

(56) References Cited

U.S. PATENT DOCUMENTS

2003/0236933 A1*  12/2003  Shigeta et al. ................. 710/72
2005/0010835 A1*   1/2005  Childs et al. .................... 714/6
2005/0052548 A1*   3/2005  Delaney ..................... 348/231.2

* cited by examiner

Primary Examiner—Christopher S McCarthy

(57) ABSTRACT

A data auto backup system and method is proposed, applicable in a computer system connected with an external storage device for backing up data of the external storage device to the computer system during a power-off state of the computer system. The computer system includes a bus interface, a storage module, an input/output interface, and a power module. The data auto backup system includes: an input unit for inputting a predefined signal; a memory unit for storing a backup program; a detection unit for detecting whether the external storage device is connected with the bus interface and generating a corresponding signal; a processing unit for receiving and processing the corresponding signal so as to generate a first driving signal, and executing the backup program according to the predefined signal so as to generate a second driving signal; and a control unit for receiving the first and second driving signals.

10 Claims, 2 Drawing Sheets

DATA AUTO BACKUP SYSTEM AND METHOD

BACKGROUND OF THE INVENTION

1. Field of the Invention

The present invention relates generally to a data backup technique, and more particularly to a data auto backup system and method that can automatically backup data from an external storage device to a computer system white the computer system is in its power off state.

2. Description of Related Art

With the rapid development of computer technology, more and more information is generated and needs to be stored for retrieval. To store generated information, many different kinds of external storage devices have appeared on the market such as CD players and mp3 players. As the "digital home" proposed by Microsoft and similar concepts becomes popular, computers and home media appliances are rapidly merging. For example, computers systems have come to market that can perform multimedia functions (playing, recording, and so on) without the need of running an operation system, replacing the need for traditional single-function home appliances such as CD players, VCD players, and DVD players. Such devices provide the functionality of a general-purpose computer system when the system is fully up and running an operating system with the convenience of a dedicated instant-on appliance such as a television or DVD player.

Moreover, people increasingly want to connect and utilize other kinds of storage devices such as cameras in such a quick and convenient manner. In particular, it would be convenient to be able to quickly backup the data of an external storage device to a computer system. However, in order to backup data from the memory of an external storage device to a computer, the computer must first be booted up and running an operating system. Thereafter, data from the memory of the external device can be copied to a directory of the computer, either manually, attended by the user, or automatically. However, such a method is rather inconvenient in that it forces the user to wait for the computer to boot up and run the operating system regardless of whether the user wants to access the general functionality that the computer provides.

Accordingly, there exists a need in the art for a data auto backup technique that can be applied to a computer system to solve the drawback of the above-described conventional technology, so as to further increase the functionality of the computer.

SUMMARY OF THE INVENTION

To overcome the above drawback, it is an objective of the present invention to provide a data auto backup system and method that can automatically back up data from an external storage device to a computer system connected with the external storage device without the need of running the operating system of the computer system.

It is another objective of the present invention to provide a data auto backup system and method that can conveniently and timely back up data without being affected by the operating system.

In order to attain the objectives mentioned above and the others, a data auto backup system and method is proposed that is applicable in a computer system externally connected with a storage device for backing up data of the external storage device to the computer system during the power-off state of the computer system. The computer system comprises a bus interface, a storage module, an input/output interface, and a power module for providing power to the data auto backup system. The data auto backup system comprises: an input unit for inputting a predefined signal; a memory unit for storing a backup program; a detection unit for detecting whether an external storage device is connected with the bus interface of the computer system and generating a signal in response; a processing unit for receiving and processing the signal emitted by the detection unit so as to generate a first driving signal, and executing the backup program of the memory unit according to the predefined signal so as to generate a second driving signal; and a control unit for receiving the first driving signal from the processing unit to make the input/output interface initialize the bus interface and the storage module, and receiving the second driving signal from the processing unit to cause data of the external storage device to be uploaded to the storage module.

The external storage device is a portable electronic device such as a digital camera or a digital video camera. The bus interface can be a USB interface, an IEEE 1394 interface, a network interface, an IDE interface, a SCSI interface or a SATA interface. The storage module can be a hard disk.

The data auto backup method at feast comprises the steps of: (1) storing a backup program; (2) detecting whether an external storage device is connected with the bus interface of the computer system, and, if connected, going to step (3), or otherwise, looping back to step (2); (3) making the computer system initialize the bus interface and the storage module; and (4) executing the backup program to make a control unit upload data of the external storage device to the storage module.

According to the data auto backup system and method of the present invention, a detection unit first detects whether an external storage device is connected with a bus interface of a computer system, generating a signal in response. If an external storage device is connected, the bus interface and the storage module of the computer system are initialized and an internal backup program is executed to upload data of the external storage device to the computer system without the need of booting up the computer system and running the operation system thereof, thereby increasing functionality of the computer system and also increasing the possibility of replacing single-function home appliances with computer systems.

DETAILED DESCRIPTION OF PREFERRED EMBODIMENTS

The following illustrative embodiments are provided to illustrate the disclosure of the present invention, these and other advantages and effects being apparent to those skilled in the art after reading the disclosure of this specification. The present invention can also be performed or applied with other differing embodiments. The details of the specification may be changed to meet various objectives and applications, and numerous modifications and variations can be devised without departing from the spirit of the present invention.

Figure 1:
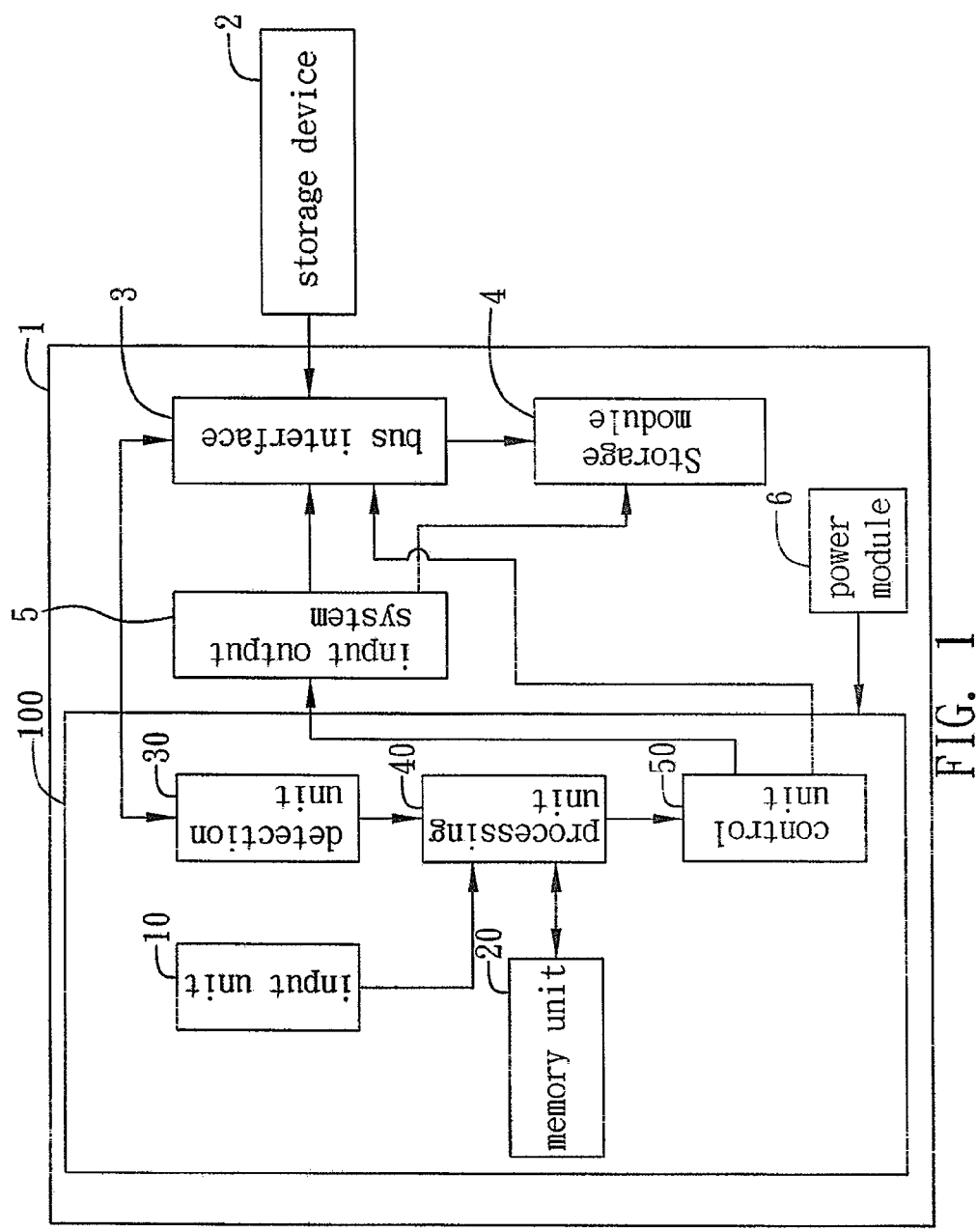
FIG. 1 depicts a basic block diagram of a data auto backup system according to the present invention.

FIG. 1 shows a basic block diagram of a data auto backup system of the present invention. The data auto backup system 100 of the present invention can be applied to a computer system 1 externally connected with a storage device 2 for backing up data of the external storage device 2 to the computer system 1 white the computer system 1 is in the power off state. The computer system 1 comprises a bus interface 3, a storage module 4, an input/output interface 5, and a power module 6 for providing power to the data auto backup system 1.

The external storage device 2 can be a portable electronic device such as a digital camera or a digital video camera.

The bus interface 3 is a communicating interface between the computer system 1 and the external storage device 2, such as a USB interface, an IEEE 1394 interface, a network interface, an IDE interface, a SCSI interface or a SATA interface.

The storage module 4 is used to store data of the external storage device 2. In the present embodiment, the storage module 4 is a hard disk.

The data auto backup system 100 comprises an input unit 10, a memory unit 20, a detection unit 30, a processing unit 40, and a control unit 50.

The input unit 10 is used to input a predefined signal. The input unit 10 can be a switching device such as an inputting key.

The memory unit 20 is used to store a backup program to be executed by the processing unit 40 once the processing unit 40 receives a signal from the detection unit 30.

The detection unit 30 is used to detect whether the external storage device 2 is connected with the bus interface 3 of the computer system 1.

The processing unit 40 is used to receive and process the signal detected by the detection unit 30 so as to generate a first driving signal, and execute the backup program of the memory unit 20 according to the predefined signal so as to generate a second driving signal.

The control unit 50 is used to receive the first driving signal of the processing unit 40 for making the input/output interface 5 initialize the bus interface 3 and the storage module 4, and receive the second driving signal of the processing unit 40 for uploading data of the external storage device 2 to the storage module 4.

Figure 2:
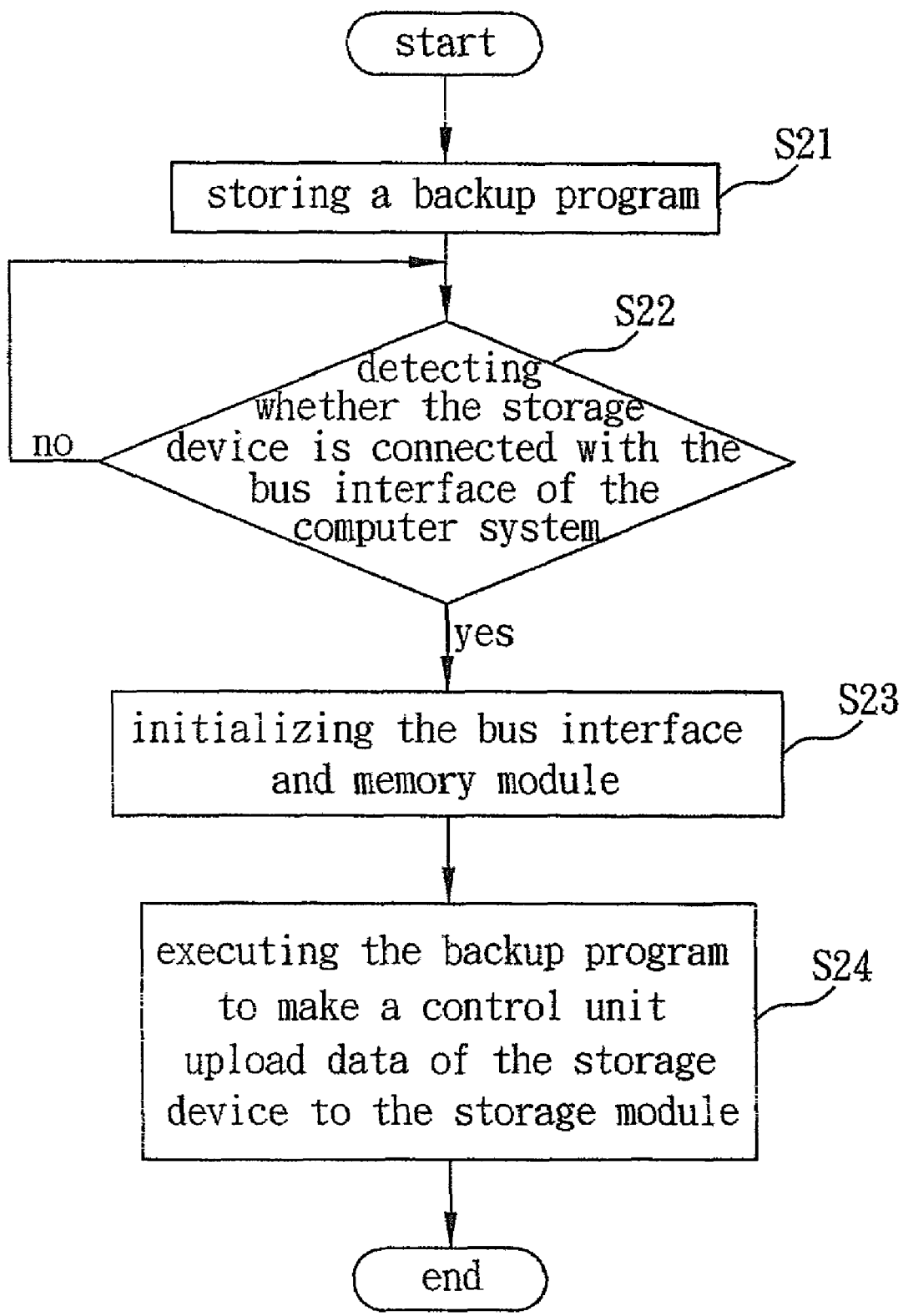
FIG. 2 depicts a process flow of a data auto backup method according to the present invention.

FIG. 2 is a process flow of a data auto backup method of the present invention. The data auto backup method can be applied in a computer system externally connected with a storage device for backing up data of the external storage device to the computer system white the computer system is in the power off state. Therein, the computer system comprises a bus interface, a storage module, an input/output interface, and a power module for providing power to data auto backup process.

As shown in FIG. 2, the data auto backup method begins at step S21, wherein a backup program is stored in a memory unit.

Then, at step S22, detect whether an external storage device is connected with the bus interface of the computer system, and, if connected, proceed to step S23, or otherwise, hoop back to step S22;

At step S23, make the computer system initialize the bus interface and the storage module, then proceed to step S24.

At step S24, execute the backup program to make the control unit upload data of the external storage device to the storage module, then end the process flow.

According to the data auto backup system and method of the present invention, a detection unit first detects whether an external storage device is connected with a bus interface of the computer system, generating a signal in response. If an external storage device is connected, the bus interface and the storage module of the computer system are initialized and an internal backup program is performed so as to upload data of the external storage device to the computer system without the need of booting up the computer system and running an operation system thereof, thereby increasing functionality of the computer system and also increasing the possibility of replacing single-function home appliances with computer systems.

The above-described description of the detailed embodiment are only to illustrate the preferred implementation according to the present invention, and not intended to limit the scope of the present invention, i.e., other changes can be implemented in the present invention. Accordingly, aft modifications and variations completed by those with ordinary skiff in the art should fall within the scope of present invention defined by the appended claims.

What is claimed is:

1. A data auto backup system applicable in a computer system connected with an external storage device for backing up data of the external storage device to the computer system, wherein the computer system comprises a bus interface, a storage module, an input/output interface, and a power module for providing power for the data auto backup system, the data auto backup system comprising:

an input unit for inputting a predefined signal;

a memory unit for storing a backup program;

a detection unit for detecting whether an external storage device is connected with the bus interface of the computer system and generating a signal upon detection;

a processing unit for receiving and processing the signal generated by the detection unit so as to generate a first driving signal, and for executing the backup program of the memory unit according to the predefined signal from the input unit so as to generate a second driving signal; and a control unit for receiving the first driving signal from the processing unit to make the input/output interface initialize the bus interface and the storage module, and for receiving the second driving signal from the processing unit to cause data of the external storage device to be uploaded to the storage module.

2. The data auto backup system of claim 1, wherein the external storage device is a portable electronic device.

3. The data auto backup system of claim 2, wherein the portable electronic device is one of a digital camera and a digital video camera.

4. The data auto backup system of claim 1, wherein the bus interface is one of a USB interface, an IEEE 1394 interface, a network interface, an IDE interface, a SCSI interface and a SATA interface.

5. The data auto backup system of claim 1, wherein the storage module is a hard disk.

6. A data auto backup method applicable in a computer system connected with an external storage device for backing up data of the external storage device to the computer system, wherein the computer system comprises a bus interface, a storage module, an input/output interface, and a power module for providing power to data auto backup process, the data auto backup method at least comprising the steps of:

(1) storing a backup program;

(2) detecting whether an external storage device is connected with the bus interface of the computer system, and, if connected, going to step (3), otherwise, looping back to step (2);

(3) making the computer system initialize the bus interface and the storage module; and (4) executing the backup program to make a control unit upload data of the external storage device to the storage module.

7. The data auto backup method of claim 6, wherein the external storage device is a portable electronic device.

8. The data auto backup method of claim 7, wherein the portable electronic device is one of a digital camera and a digital video camera.

9. The data auto backup method of claim 6, wherein the bus interface is one of a USB interface, an IEEE 1394 interface, a network interface, an IDE interface, a SCSI interface and a SATA interface.

10. The data auto backup method of claim 6, wherein the storage module is a hard disk.

* * * * *